United States Patent [19]
Espindola et al.

[11] Patent Number: 5,953,471
[45] Date of Patent: Sep. 14, 1999

[54] OPTICAL COMMUNICATION SYSTEM HAVING SHORT PERIOD REFLECTIVE BRAGG GRATINGS

[75] Inventors: Rolando Patricio Espindola, West Orange; Ashish Madhukar Vengsarkar, Berkeley Heights, both of N.J.; Jefferson Lynn Wagener, Charlottesville, Va.

[73] Assignee: Lucent Technologies, Inc., Murray Hill, N.J.

[21] Appl. No.: 08/886,783

[22] Filed: Jul. 1, 1997

[51] Int. Cl.$^6$ ........................................... G02B 6/34
[52] U.S. Cl. ................................. 385/37; 430/290
[58] Field of Search .................. 385/10, 37; 356/32; 65/392; 430/290

[56] References Cited

U.S. PATENT DOCUMENTS

| | | | |
|---|---|---|---|
| 4,806,012 | 2/1989 | Meltz et al. | 356/32 |
| 5,104,209 | 4/1992 | Hill et al. | 385/27 |
| 5,313,538 | 5/1994 | Sansonetti | 385/28 |
| 5,327,515 | 7/1994 | Anderson et al. | 385/123 |
| 5,351,321 | 9/1994 | Snitz et al. | 385/10 |
| 5,367,588 | 11/1994 | Hill et al. | 385/37 |
| 5,430,817 | 7/1995 | Vengsarkar | 385/37 |
| 5,604,826 | 2/1997 | Bruesselbach | 385/37 |
| 5,620,495 | 4/1997 | Aspell et al. | 65/392 |
| 5,745,617 | 4/1998 | Starodubov et al. | 385/37 |

FOREIGN PATENT DOCUMENTS 0 675 611 A2   10/1995   European Pat. Off. ........ H04B 10/17

OTHER PUBLICATIONS

Ashish M. Vengsarkar, "Long–period fiber gratings shape optical spectra", Laser Focus World, Jun. 1996, 4 pages, publisher, PennWell Publishing Company.

"Using microcontact printing to generate amplitude photomasks on the surfaces of optical fibers: A method for producing in–fibr gratings" by John A. Rogers, Rebecca J. Jackman and George M. Whitesides, Harvard University, and Jefferson L. Wagener and Asish M. Vengsarkar, Lucent Technologies Inc., in Appl. Phys. Lett. 70,, Jan. 6, 1997, pp. 7–9.

*Primary Examiner*—John D. Lee
*Assistant Examiner*—Juliana K. Kang
*Attorney, Agent, or Firm*—John M. Harman

[57] ABSTRACT

Embodiments of the invention include a method for fabricating Bragg reflector gratings using an amplitude mask and an amplitude mask apparatus for fabricating Bragg reflectors. The inventive Bragg reflector gratings have periodicities greater than conventional short period gratings but much less than conventional long period gratings. Short period, Bragg reflector gratings according to embodiments of the invention have periodicities, e.g., within the range from 1 $\mu$m to 10 $\mu$m. The fabrication method includes positioning an amplitude mask having appropriate slits formed therein over the photosensitive waveguide of interest and then illuminating the waveguide through the slits thereby photo-inducing a periodic pattern of refractive index perturbations characteristic of a Bragg reflector. The short period, Bragg grating produced by the inventive amplitude mask is a reflective grating whose reflection characteristics approach approximately 99.99%. Reflective gratings fabricated in accordance with embodiments of the invention are useful in adding and dropping channels in wavelength division multiplexed systems and in applications such as laser stabilization and structural integrity sensing.

5 Claims, 2 Drawing Sheets

OPTICAL COMMUNICATION SYSTEM HAVING SHORT PERIOD REFLECTIVE BRAGG GRATINGS

BACKGROUND OF THE INVENTION

1. Field of the Invention

The invention relates to optical waveguides including optical fibers. More particularly, the invention relates to writing Bragg gratings in optical fibers.

2. Description of the Related Art

Gratings are periodic changes in the index of refraction of the photosensitive core of an optical fiber. A region of periodic perturbations or modulations in the refractive index (e.g., a Bragg grating) is useful in causing reflection of a narrow range of wavelengths of the light transmitted in the fiber core, while allowing wavelengths outside the narrow range to pass through the fiber without reflection. Gratings of this kind are used, e.g., as filters.

The dimension of the grating period relative to the wavelength of the incident light and the length of the grating affect light transmission through the fiber in terms of wavelength range and percentage of light transmitted. Short period gratings, i.e., gratings having periodicities of approximately 1 $\mu$m or less, are reflective gratings, which are useful for laser stabilization, sensing structural imperfections, and for adding and dropping channels in wavelength division multiplexed (WDM) systems. Long period gratings or transmissive gratings, i.e., those gratings having periodicities, e.g., within a range from approximately 50 $\mu$m to approximately 1500 $\mu$m, are useful as band-stop filters and gain-equalizers in optical amplifiers.

Conventionally, for a short-period grating, the refractive-index perturbations are written on the core of optical fibers by impinging a standing-wave interference pattern of ultraviolet (UV) or other suitable light along the length of the fiber using light launched from the fiber end (e.g., as disclosed in U.S. Pat. No. 4,474,427). In this technique, the periodicity of the grating is equal to that of the standing wave. Alternatively, gratings are written along the length of the fiber using an interference pattern created outside of the optical fiber by the angled application of several transverse beams of UV light (see e.g., U.S. Pat. No. 4,725,110 issued Feb. 16, 1988 to Glenn et al. and U.S. Pat. No. 4,807,950 issued Feb. 28, 1989 to Glenn et al.). In this manner, the grating periodicity is controlled by the angle of incidence of the interfering beams. Also, the resulting gratings reflected light at much longer wavelengths, e.g., at 1.55 $\mu$m, a wavelength of interest for present-day optical fiber communication systems. Such techniques are especially suitable for writing short period gratings because of the feature accuracy that such techniques produce.

Further developments in writing short period Bragg gratings yielded the phase mask or phase-shifting mask. For example, see U.S. Pat. No. 5,367,588, issued Nov. 22, 1994 to Hill et al. A phase mask employs a surface relief pattern having grating striations shaped appropriately to modulate spatially the phase of the illuminating light, thus forming an appropriate interference pattern having the required periodicity. The interference pattern is imprinted (photoinduced) into the optical fiber via laser irradiation of the phase mask with UV light.

Techniques using phase masks that impinge interference patterns on a grating are highly accurate with respect to grating features and therefore are especially useful in the fabrication of short period gratings. However, such interference techniques typically are difficult to align, especially within a mass production-type environment. Furthermore, even the slightest degree of misalignment is magnified by the relatively high degree of accuracy of the grating features produced.

By comparison, long period gratings typically are characterized by longer periodicities and larger grating features and thus require less accuracy when writing. Therefore, grating writing techniques more conducive to the mass production of optical waveguide devices were developed as methods for writing long period gratings in optical fibers. One such method includes illuminating the fiber from the side through a mask having a slit therein (see, e.g., U.S. Pat. No. 5,104,209 issued Apr. 14, 1992 to Hill et al.). In this particular technique, the slit is equal in width to the desired width of the refractive index perturbations, which are written on the fiber in a point-by-point manner, with movement of the fiber with respect to the slit mask providing the periodicity of the grating region.

However, in forming gratings in optical fibers, the plurality of index perturbations written on the fiber core must have a consistent periodicity. Accordingly, a slit mask having a single slit therein is not well suited for the accuracy required in writing individual index perturbations with consistent periodicities. Moreover, the serial nature involved in writing the periodic index perturbations invites misalignment and reduced accuracy. Therefore, the slit mask evolved into the amplitude mask, which includes a plurality of periodic slits therein (see, e.g., U.S. Pat. No. 5,430,817 issued Jul. 4, 1995 to Vengsarkar). The amplitude mask's plurality of periodic variations in transmission is used to produce a grating along the core of an optical fiber. It is believed that amplitude masks have been demonstrated for transmissive, long period gratings only.

There is a need for fabricating reflective gratings in a manner that advantageously enjoys the beneficial aspects of both amplitude masks when used to form long period, transmissive gratings and of interferometric grating writing techniques when used to form short period Bragg reflectors. It is desired that such fabrication be more conducive to the alignment concerns of mass production techniques, yet without sacrificing the accuracy inherent in interferometric methods of writing gratings.

SUMMARY OF THE INVENTION

The invention is embodied in a method for fabricating Bragg reflector gratings of a higher-order using an amplitude mask and an amplitude mask apparatus for fabricating such Bragg reflectors. The inventive Bragg reflector gratings have periodicities longer than conventional short period gratings but much shorter than conventional long period gratings. Short period, Bragg reflector gratings according to embodiments of the invention have periodicities, e.g., within the range from 1 $\mu$m to 10 $\mu$m. The fabrication method includes positioning an amplitude mask having appropriate slits formed therein over the photosensitive waveguide of interest and then illuminating the waveguide through the slits thereby photoinducing a periodic pattern of refractive index perturbations characteristic of a Bragg reflector. The short period, Bragg grating produced by the inventive amplitude mask is a reflective grating whose reflection characteristics approach approximately 99.99%. Reflective gratings fabricated in accordance with embodiments of the invention are useful in adding and dropping channels in wavelength division multiplexed systems and in applications such as laser stabilization and structural integrity sensing.

DETAILED DESCRIPTION

Figure 1:
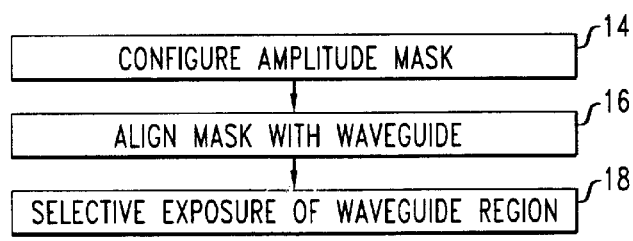
FIG. 1 is a simplified block diagram of a fabrication process according to embodiments of the invention.

In the following description like reference numerals indicate like components to enhance the understanding of the invention through the description of the drawings.

Although specific features, configurations and arrangements are discussed hereinbelow, it should be understood that such is done for illustrative purposes only. A person skilled in the relevant art will recognize that other steps, configurations and arrangements can be used without departing from the spirit and scope of the invention.

Referring now to FIG. 1, a simplified block diagram of a fabrication process 10 according to embodiments of the invention is shown. As will be discussed in greater detail hereinbelow, fabrication process 10 according to embodiments of the invention includes a first step 14 of configuring an amplitude mask, a second step 16 of positioning or aligning the amplitude mask adjacent the waveguide and a third step 18 of selectively exposing the waveguide through the amplitude mask.

Figure 2:
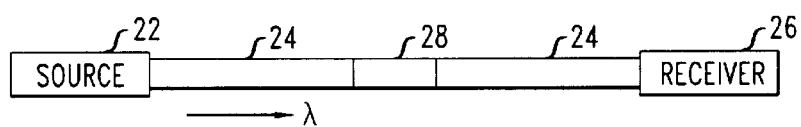
FIG. 2 is a schematic depiction of an optical communication system using a short period, Bragg reflector grating in accordance with an embodiment of the invention.

FIG. 2 shows a communication system 20 having a short period, Bragg reflector grating in accordance with embodiments of the invention. Communication system 20 comprises a source 22 for modulating optical signals, an optical waveguide 24 such as an optical fiber for transmitting optical signals and a receiver 26 for receiving and demodulating the optical signals. Source 22 is any suitable device for transmitting an optical signal such as a digitally modulated 1.55 $\mu$m signal. Optical waveguide 24 is, e.g., an optical fiber for transmitting broad band light of wavelength centered about $\lambda$. Optical waveguide 24 includes at least one short period, Bragg reflector grating or grating region 28 in accordance with embodiments of the invention.

Figure 3:
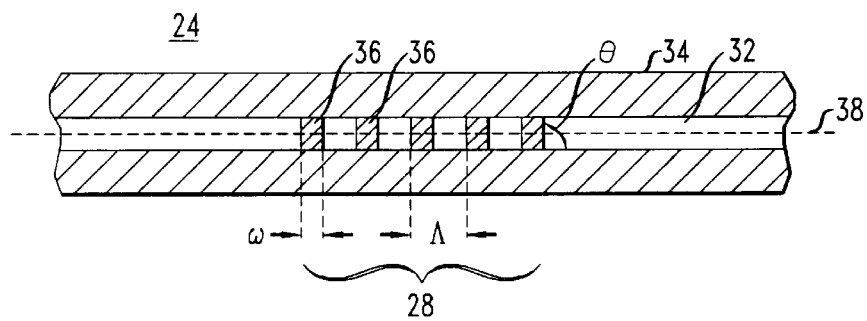
FIG. 3 is a schematic, cross sectional view of a short period, Bragg reflector grating according to an embodiment of the invention.

FIG. 3 depicts a short period, Bragg reflector grating region 28 within an optical fiber 24 according to embodiments of the invention. Optical fiber 24 has a core 32 surrounded by a cladding 34 with an index of refraction lower than that of core 32. Core 32 includes at least one grating region 28 having a plurality of refractive index perturbations 36 of width w and spaced apart as shown so that the periodicity of perturbations 36 is approximately $\Lambda$. The width w of refractive index perturbations 36 is, e.g., approximately ½$\Lambda$. Typically, width w is ⅕$\Lambda \leq w \leq$ ⅘$\Lambda$. Refractive index perturbations 36 typically are written so as to be perpendicular with the longitudinal axis (shown as 38) of optical fiber 24. However, it is possible for perturbations 36 to form an angle $\theta$ (e.g., 2°$\leq \theta \leq$ 90°) with a longitudinal axis 38 of core 32 of optical fiber 24.

As is known in the art, the periodicity of perturbations 36 is chosen to bridge the momentum (propagation constant) mismatch between the two modes that the grating is designed to couple. At the resonant wavelength of the structure, phase-matched, efficient power exchange between the coupled modes is possible. For example, the wavelength of light $\lambda_B$ reflected from a waveguide having a Bragg grating region is approximately equal to $2n_{EFF}\Lambda/m$, where $n_{EFF}$ is the effective index of the optical fiber mode, m is the order of the grating, and $\Lambda$ is the period of the index perturbations in the waveguide. The effective index of the optical mode, $n_{EFF}$, is dependent on $n_1$ and $n_2$, which are material refractive indices of the waveguide core and cladding, respectively.

In conventional waveguide systems, m typically is 1, $n_{EFF}$ is approximately 1.5 and $\Lambda$ is approximately 0.5 $\mu$m, thus providing a periodicity that will reflect light at a wavelength $\lambda_B$ of approximately 1.5 $\mu$m. According to embodiments of the invention, higher order gratings are written using amplitude masks. That is, for m greater than 1 and typically within the range from approximately 2 to approximately 20, gratings are written that have periodicities within the range from approximately 1 $\mu$m to approximately 10 $\mu$m.

As mentioned previously, short period gratings, because of their relatively small dimensions, conventionally have been written using interferometric techniques or phase masks. By comparison, long period gratings, whose refractive index perturbations 36 have a periodicity at least approximately 10 times and typically between 50 and 1500 times greater than the wavelength of light ($\lambda$), conventionally are fabricated using slit masks or amplitude masks, which are easier to manufacture, configure and align. Also, slit masks and amplitude masks are more conducive to mass production, even though they are not necessarily as accurate as interferometric techniques in terms of grating size and feature resolution.

In accordance with embodiments of the invention, Bragg reflector gratings with refractive index perturbations having periodicities, e.g., within the range from approximately 1 $\mu$m to approximately 10 $\mu$m, are fabricated using amplitude masks. Such reflective gratings are considered to be short period gratings because, even though their periodicities are not as small as conventional short period gratings ($\Lambda \leq$ 1 $\mu$m), their periodicities are much less than conventional long period gratings ($\Lambda \leq$ 10 $\mu$m).

According to embodiments of the invention, waveguide 24 is a single mode optical fiber having a silica core doped with a photosensitive material such as germanium, boron or phosphorus. Alternatively, waveguide 24 is a multi-mode optical fiber or other suitable waveguide capable of use in accordance with embodiments of the invention. Also, it is possible for waveguide 24 to be an optical fiber loaded with hydrogen to enhance its photosensitivity.

Figure 4:
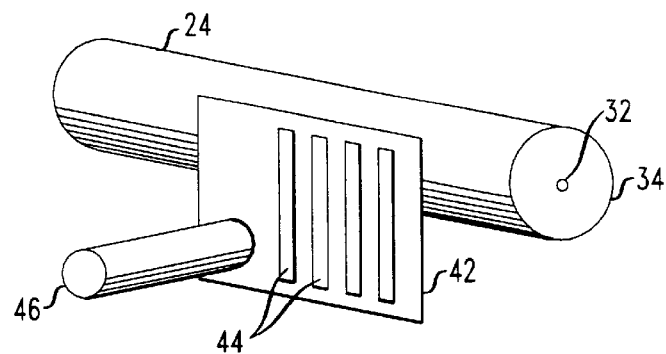
FIG. 4 is a schematic view of fabricating a short period, Bragg reflector grating according to embodiments of the invention, showing the use of an amplitude mask according to an embodiment invention.

FIG. 4 illustrates an amplitude mask 42 and its use in fabricating a short period, Bragg reflector grating according to embodiments of the invention. The grating region is formed by selectively exposing core 32 through one or more slits 44 formed in amplitude mask 42. As discussed previously herein, slits 44 in amplitude mask 42 are dimensioned to be, e.g., approximately the same size as the desired width w of the perturbation, which typically is approximately half the size of the desired periodicity $\Lambda$.

Amplitude mask 42 is configured by forming therein a plurality of slits 44 of width w and having a center-to-center spacing of $\Lambda$. An exemplary amplitude mask is made of a silica substrate with chrome plated regions that block transmission of ultraviolet (UV) light. Thus, the silica portions would form slits 44 and allow UV light to pass therethrough and the chrome portions would prevent UV light from passing. The number of perturbations within a given grating region 28 depends on the application, however, typical gratings have between approximately 100 and approximately 100,000 perturbations per grating region.

Amplitude mask 42 is aligned or positioned adjacent waveguide 24 or otherwise attached to waveguide 24 at a desired exposure site for the grating region. Such is performed using, e.g., any conventional or otherwise suitable positioning, aligning or attaching device or technique. See, e.g., "Using microcontact printing to generate amplitude photomasks on the surfaces of optical fibers: A method for producing in-fiber gratings", Appl. Phys. Lett. 70 (1), Jan. 6, 1997.

Waveguide 24 is then selectively exposed through amplitude mask 42 by directing a beam of light 46 through slits 44. In this manner, a short period, Bragg reflector region 28 such as shown in FIG. 3 is fabricated, wherein grating region 28 has a plurality of perturbations 36 of width w and a periodicity of Λ. Light beam 46 is, e.g., ultraviolet (UV) radiation from a source such as a continuous wave (CW) laser, a scanned laser, a KrF excimer laser or other suitable source.

According to embodiments of the invention, perturbations 36 are dimensioned such that at least approximately 50% of the light transmitted at wavelength λ is coupled to backward traveling modes. For example, it has been found that using CW laser light with powers ranging between approximately 10 and approximately 100 milliwatts (mW), with exposure times between approximately 10 minutes and approximately 50 minutes results in gratings with greater than approximately 50% reflectivities. It should be noted that the ability to hold a pattern on a fiber for tens of minutes is made easier because of the relatively longer periodicities of embodiments of the invention compared to conventional short period Bragg gratings.

Figure 5A:
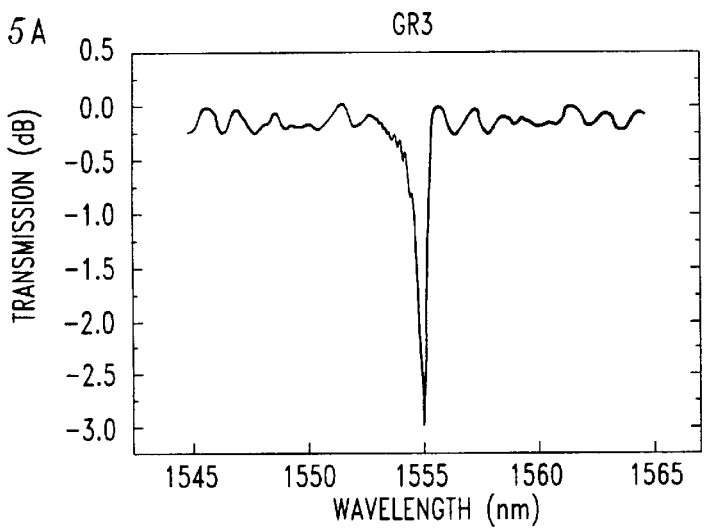
FIGS. 5a–5c are graphical views of the transmission spectrum of a fiber grating made in accordance with an embodiment of the invention.
Figure 5B:
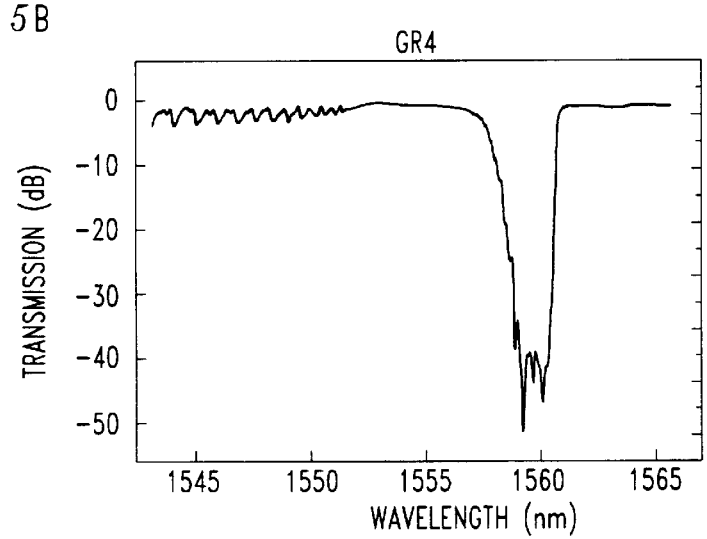
Figure 5C:
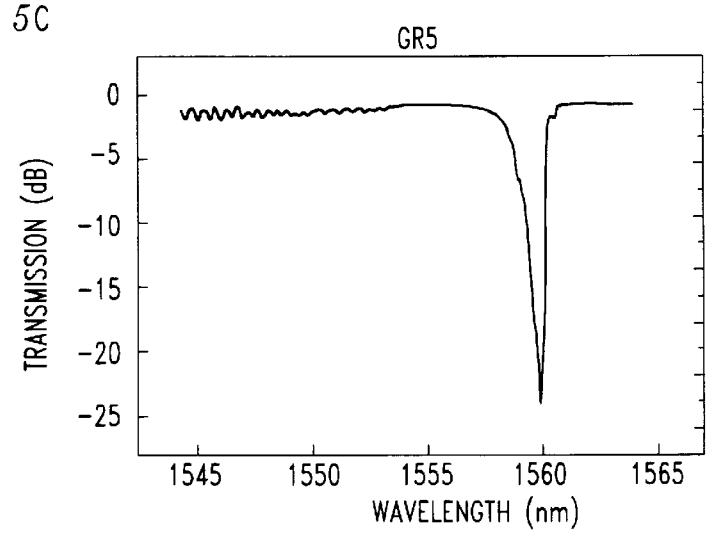

FIGS. 5a–c show the transmission spectrum of various gratings fabricated in photosensitized (deuterium-loaded) fibers in accordance with embodiments of the invention. As can be seen from FIG. 5a, a grating region with m=4 and Λ=2.2 μm had a main reflectivity centered at approximately 1555 nanometers (nm) and a transmission dip approaching approximately −3.0 decibel (dB), which corresponds to approximately 50% reflection. This grating whose characteristics are shown in FIG. 5a was written with CW light of wavelength 257 nm and with an exposure time of 10 minutes.

Similarly, in FIG. 5b, a grating region with perturbations of width 1.1 μm and a periodicity of 2.2 μm had a main reflectivity centered at approximately 1555 nm. Such grating region had a transmission dip in the general range of approximately −30 to −40 dB (i.e., greater than 99.9% reflection). This relatively high reflectivity was obtained via exposure for approximately 75 minutes.

Another grating fabricated according to embodiments of the invention is shown in FIG. 5c. The grating perturbations, for m=5, were 1.34 μm wide with a periodicity of Λ=2.68 μm. The peak reflectivity was centered at approximately 1560 nm and had a transmission dip below approximately −20 dB, corresponding to a 99% reflection.

It should be noted that while the examples discussed hereinabove involve circular optical fibers, embodiments of the invention also are suitable for use with planar waveguides.

Embodiments of the invention advantageously provide the convenience of using lithographic techniques such as amplitude masks in the fabrication of short period gratings. Conventionally, gratings with short periodicities (e.g., typically less than approximately 1 μm) require the accuracy of interferometric techniques such as phase masks and wave interference patterns for writing on optical waveguides.

However, gratings according to embodiments of the invention are used advantageously in applications for which periodicities larger than those of conventional short period gratings are acceptable. That is, conventional short period, Bragg reflective gratings having periodicities of approximately 0.5 μm typically reflect approximately 99% of transmitted light at a wavelength of 1.55 μm. In accordance with embodiments of the invention, Bragg reflective gratings having periodicities, e.g., within the range from approximately 1 μm to approximately 10 μm, are fabricated using lithographic techniques such as amplitude masks and have a peak reflectivity approaching 99.99%. In this manner, gratings according to embodiments of the invention advantageously use lithographic writing techniques such as amplitude masks that heretofore have only been demonstrated with long period gratings.

In accordance with alternative embodiments of the invention, multiple fiber gratings are produced from a single amplitude mask via sequential processing of a group of optical fibers.

Also, alternatively, multiple gratings are written in spatially separated regions of a single optical fiber. One way to achieve this is to provide a single amplitude mask that includes two or more slit regions, each corresponding to one of the fiber regions. These regions may be illuminated either simultaneously or sequentially. Sequential illumination is performed, e.g., by a continuous scan, or by separate exposure steps. Illumination is by a single light beam, by multiple light beams that have been split from a single source, or by light beams from multiple sources.

In another embodiment, the amplitude mask is a "chirped" mask. That is, the periods of the mask are non-uniform. For example, the periods vary linearly from approximately 2.2 μm at one end to approximately 2.4 μm at the opposing. Such chirped masks are used to fabricate gratings with complex optical spectra.

Short period, Bragg reflector gratings according to embodiments of the invention are useful in applications such as laser stabilization, adding and dropping channels in wavelength division multiplexed (WDM) systems, and in various sensing operations, such as sensing physical imperfections of certain structures. In this manner, a series of short period, Bragg reflector grating regions are written on a fiber whose respective reflectivities are low enough to allow a sufficient amount of light to be transmitted through the entire fiber yet large enough to reflect a sufficient amount of light containing structural integrity information of the device being tested.

It will be apparent to those skilled in the art that the short period, Bragg reflector gratings according to embodiments of the invention are capable of existing in other applications not specifically disclosed herein without departing from the spirit and scope of the invention. Also, it will be apparent to those skilled in the art that many changes and substitutions can be made to the embodiments of the short period, Bragg reflector gratings described herein without departing from the spirit and scope of the invention as defined by the appended claims and their full scope of equivalents.

What is claimed is:

1. An optical communications system, comprising:

a source of at least one optical signal;

a waveguide optically coupled to said source for transmitting an optical signal; and at least one region disposed in said waveguide having at least one reflective Bragg grating of a higher order wherein m is greater than 1, said Bragg grating including a plurality of refractive index perturbations spaced apart by a periodic distance $\Lambda$ where $\Lambda$ is within the range from approximately 1 $\mu$m to approximately 10 $\mu$m.

2. The system as recited in claim 1, wherein said optical waveguide has a longitudinal axis and wherein said short period reflective Bragg grating has a plurality of periodic refractive index gratings approximately perpendicular to said longitudinal axis of said optical waveguide.

3. The system as recited in claim 1, further comprising a receiver optically coupled to said waveguide for receiving an optical signal transmitted along said waveguide.

4. The system as recited in claim 1, wherein said optical waveguide is an optical fiber.

5. The system as recited in claim 1, wherein said optical waveguide has a longitudinal axis and wherein said short period reflective Bragg grating has a plurality of periodic refractive index gratings that form an angle $\theta$ with respect to said longitudinal axis within the range from approximately 2 degrees to approximately 90 degrees.

* * * * *